(12) United States Patent
Harel et al.

(10) Patent No.: US 10,142,864 B2
(45) Date of Patent: Nov. 27, 2018

(54) DISTRIBUTED ANTENNA SYSTEM CONTINUITY

(71) Applicant: Corning Optical Communications Wireless Ltd, Airport (IL)

(72) Inventors: Dror Harel, Hod Hasharon (IL); Boris Radin, Ashdod (IL)

(73) Assignee: Corning Optical Communications Wireless Ltd, Airport (IL)

( * ) Notice: Subject to any disclaimer, the term of this patent is extended or adjusted under 35 U.S.C. 154(b) by 45 days.

(21) Appl. No.: 15/278,746

(22) Filed: Sep. 28, 2016

(65) Prior Publication Data

US 2017/0019808 A1    Jan. 19, 2017

Related U.S. Application Data

(63) Continuation of application No. PCT/IL2015/050313, filed on Mar. 25, 2015.

(60) Provisional application No. 61/972,659, filed on Mar. 31, 2014.

(51) Int. Cl.
| | |
|---|---|
| *H04W 24/04* | (2009.01) |
| *H04B 10/2575* | (2013.01) |
| *H04W 40/04* | (2009.01) |
| *H04B 10/00* | (2013.01) |
| *H04W 84/12* | (2009.01) |
| *H04W 88/08* | (2009.01) |

(52) U.S. Cl.
CPC ........ *H04W 24/04* (2013.01); *H04B 10/2575* (2013.01); *H04W 40/04* (2013.01); *H04B 10/14* (2013.01); *H04W 84/12* (2013.01); *H04W 88/085* (2013.01)

(58) Field of Classification Search
CPC ... H04B 10/14; H04B 10/2575; H04W 24/04; H04W 40/04; H04W 84/12; H04W 88/085
USPC ........................................................ 370/221
See application file for complete search history.

(56) References Cited

U.S. PATENT DOCUMENTS

| | | |
|---|---|---|
| 2,628,312 A | 2/1953 | Peterson et al. |
| 4,167,738 A | 9/1979 | Kirkendall |
| 4,935,746 A | 6/1990 | Wells |
| 5,257,407 A | 10/1993 | Heinzelmann |
| 5,513,176 A | 4/1996 | Deal et al. |

(Continued)

FOREIGN PATENT DOCUMENTS

WO    2013009283 A1    1/2013

OTHER PUBLICATIONS

International Search Report and Written Opinion PCT/US2015/050313 dated Jun. 24, 2015.

(Continued)

*Primary Examiner* — Robert J Lopata
(74) *Attorney, Agent, or Firm* — C. Keith Montgomery

(57) ABSTRACT

Technologies are described for using optical and electrical transmission of a plurality of communications services from a plurality of outside sources to a network of users via a distributed antenna system. The systems and methods disclosed herein provide for distribution of the communications services and for re-routing the services when a failure occurs. These systems and methods detect when there is a failure of the service to the network or within the network, where the failure has occurred, and how to redistribute the services via a switching network or matrix.

25 Claims, 12 Drawing Sheets

(56) References Cited

U.S. PATENT DOCUMENTS

| | | | |
|---|---|---|---|
| 6,011,962 A | 1/2000 | Lindenmeier et al. | |
| 6,108,536 A | 8/2000 | Yafuso et al. | |
| 6,195,561 B1 | 2/2001 | Rose | |
| 6,253,067 B1 | 6/2001 | Tsuji | |
| 6,405,018 B1 | 6/2002 | Reudink et al. | |
| 6,437,577 B1 | 8/2002 | Fritzmann et al. | |
| 6,490,439 B1 | 12/2002 | Croft et al. | |
| 6,580,905 B1 | 6/2003 | Naidu et al. | |
| 6,906,681 B2 | 6/2005 | Hoppenstein | |
| 6,928,281 B2 | 8/2005 | Ward et al. | |
| 6,983,174 B2 | 1/2006 | Hoppenstein et al. | |
| 7,035,594 B2 | 4/2006 | Wallace et al. | |
| 7,146,134 B2 | 12/2006 | Moon et al. | |
| 7,233,771 B2 | 6/2007 | Proctor, Jr. et al. | |
| 7,272,359 B2 | 9/2007 | Li et al. | |
| 7,324,837 B2 | 1/2008 | Yamakita | |
| 7,385,384 B2 | 6/2008 | Rocher | |
| 7,421,288 B2 | 9/2008 | Funakubo | |
| 7,817,958 B2 | 10/2010 | Scheinert et al. | |
| 7,848,770 B2 | 12/2010 | Scheinert | |
| 8,126,510 B1* | 2/2012 | Samson | H04B 10/25753 370/315 |
| 2005/0003873 A1 | 1/2005 | Naidu et al. | |
| 2005/0148306 A1 | 7/2005 | Hiddink | |
| 2005/0281213 A1 | 12/2005 | Dohn | |
| 2006/0094470 A1* | 5/2006 | Wake | H04W 88/085 455/562.1 |
| 2007/0264009 A1* | 11/2007 | Sabat, Jr. | H04B 10/1127 398/5 |
| 2012/0039254 A1* | 2/2012 | Stapleton | H03F 1/3247 370/328 |
| 2012/0167162 A1* | 6/2012 | Raleigh | G06F 21/57 726/1 |
| 2012/0178483 A1* | 7/2012 | Rosenau | H04W 28/16 455/509 |
| 2013/0051278 A1 | 2/2013 | Watkins et al. | |
| 2013/0157664 A1* | 6/2013 | Chow | H04W 88/085 455/436 |
| 2013/0188753 A1* | 7/2013 | Tarlazzi | H04B 7/024 375/299 |
| 2015/0244562 A1* | 8/2015 | Hanson | H04L 41/06 370/242 |
| 2016/0212640 A1* | 7/2016 | Kim | H04W 24/04 |
| 2017/0055207 A1* | 2/2017 | Hagage | H04W 52/0206 |
| 2017/0078922 A1* | 3/2017 | Raleigh | H04W 28/10 |
| 2017/0180186 A1* | 6/2017 | Kim | H04L 41/06 |
| 2017/0373727 A1* | 12/2017 | Kummetz | H04W 28/08 |

OTHER PUBLICATIONS

Wake et al. "Radio over fiber for mobile communications" Microwave Photonics, 2004, pp. 157-160.

* cited by examiner

DISTRIBUTED ANTENNA SYSTEM CONTINUITY

RELATED APPLICATIONS

This application is a continuation of International Application No. PCT/IL15/050313 filed on Mar. 25, 2015, which claims the benefit of priority to Provisional Application No. 61/972,659 filed on Mar. 31, 2014, both applications being incorporated by herein by reference.

TECHNICAL FIELD

The technology of this disclosure relates generally to reliability of antenna distribution systems using both optical fiber and metallic conductors, and more particularly to distribution and re-routing of communications services when a failure occurs.

BACKGROUND

Wireless communications services are expanding rapidly into an ever-wider array of communications media. WiFi or wireless fidelity systems, for example, are now commonplace and being used in a variety of commercial and public settings, such as homes, offices, shops, malls, libraries, airports, and the like. Distributed antenna systems are commonly used to improve coverage and communication of WiFi communication systems. Distributed antenna systems typically include a plurality of spatially separated antennas. The distributed antennas systems communicate with a variety of such commercial communications systems to distribute their services to clients within range of the distributed antenna system.

One approach to deploying a distributed antenna system involves the deployment in a location of multiple radio frequency (RF) antenna coverage areas, such as multiple access points, also referred to as "antenna coverage areas." Antenna coverage areas can have a radius in the range from a few meters up to twenty meters, as an example. Combining a number of access point devices creates an array of antenna coverage areas within the location. Because each of the antenna coverage areas covers a small area, there are typically only a few users (clients) per antenna coverage area. This allows for minimizing the amount of RF bandwidth shared among the wireless system users. It may be desirable to provide antenna coverage areas in many locations of a building or throughout a building or other facility to provide distributed antenna system access to clients within the building or facility.

These antenna systems provide efficient distribution of communications services to clients, or a set of client devices, in a desired area of a location, such as a building or an array of buildings. Within the client area, distribution of the services may be provided by an internal distribution network that is a part of the distributed antenna system. The network may include optical fibers and conventional wired cables for distributing a variety of communications services. The more widely these services are distributed, the greater the chance for a failure. The failure may be caused by a broken connection, a component failure or the failure of the service itself from the service provider.

There is a need for improvement in the reliability of the distribution systems that provide these communications services. What is needed is a better way to detect failures to communicate and to overcome the failures that may occur in large networks of users.

SUMMARY

Technologies are described for using optical and electrical transmission of a plurality of communications services from a plurality of outside sources to a network of users via a distributed antenna system. The systems and methods disclosed herein provide for distribution of the communications services and for re-routing the services when a failure occurs. These systems and methods detect when there is a failure of the service to the network or within the network, where the failure has occurred, and how to redistribute the services via a switching network or matrix to overcome the failure.

In a first embodiment of the present disclosure a distributed antenna system (DAS) includes a switching matrix of a plurality of programmable switches configured for connecting a plurality of communications services to a plurality of optical input modules (OIMs). Each of the plurality of services is provided through at least one sector. A plurality of radio distributor/combiner (RDC) modules is configured for combining the plurality of communications services into a broadband communication signal or for splitting a broadband communication signal into a plurality of communications services. A control module is configured for controlling routing of a second communications service of the plurality of communications services through the switching matrix to the plurality of OIMs to provide a substitute service for a first failed communications service of the plurality of communications services.

In another embodiment of the present disclosure, a distributed antenna system (DAS) includes a first plurality of radio distribution/combiners (RDCs) configured for connecting to a plurality of communications services, each of the plurality of communications services provided through at least one sector. A second plurality of radio distribution/combiner (RDCs) is connected with the first plurality of RDCs. The second plurality of RDCs is configured for connecting to a plurality of Optical Input Modules (OIMs) for receiving the plurality of communications services. Each of the second plurality of RDCs is connected with one of the first plurality of RDCs. A first switching matrix of a first plurality of programmable switches is connected at a first end to the plurality of communications services and at a second end to the first plurality of RDCs for routing the plurality of communications services to the first plurality of RDCs. Each of the second plurality of RDCs is separately addressable by each RDC of the first plurality of RDCs. A second switching matrix of a second plurality of switches is connected at a first end to the second plurality of RDCs and at a second end to the OIMs for routing the plurality of communications services to the plurality of OIMs. Each of the OIMs is separately addressable by each RDC of the second plurality of RDCs. A control module is configured for routing the plurality of communications services to the first plurality of RDCs through the first switching matrix and for routing the plurality of communications services to the plurality of OIMs through the second switching matrix. The control module is configured, in the event of a failure of a first communications service, for controlling routing of a second communications service through the RDC modules and the switching matrices to at least one of the plurality of optical input modules (OIMs) to provide a substitute service for the first failed service.

Another embodiment of the present disclosure is a method for controlling a distributed antenna system. The method includes a step of arranging a plurality of radio distributor/combiner (RDC) modules for connecting a plurality of communications services with a plurality of optical input modules (OIMs). Each of the plurality of communications services is provided through one or more sectors. The method also includes providing a plurality of primary communication paths for the plurality of communications services through the plurality of RDC modules to the plurality of OIMs, detecting a failure of at least one first communications service of the plurality of communications services, and controlling routing of at least one second communications service of the plurality of communications services from the plurality of primary communication paths to at least one secondary redundant path to provide a substitute service for the failed first communications service.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
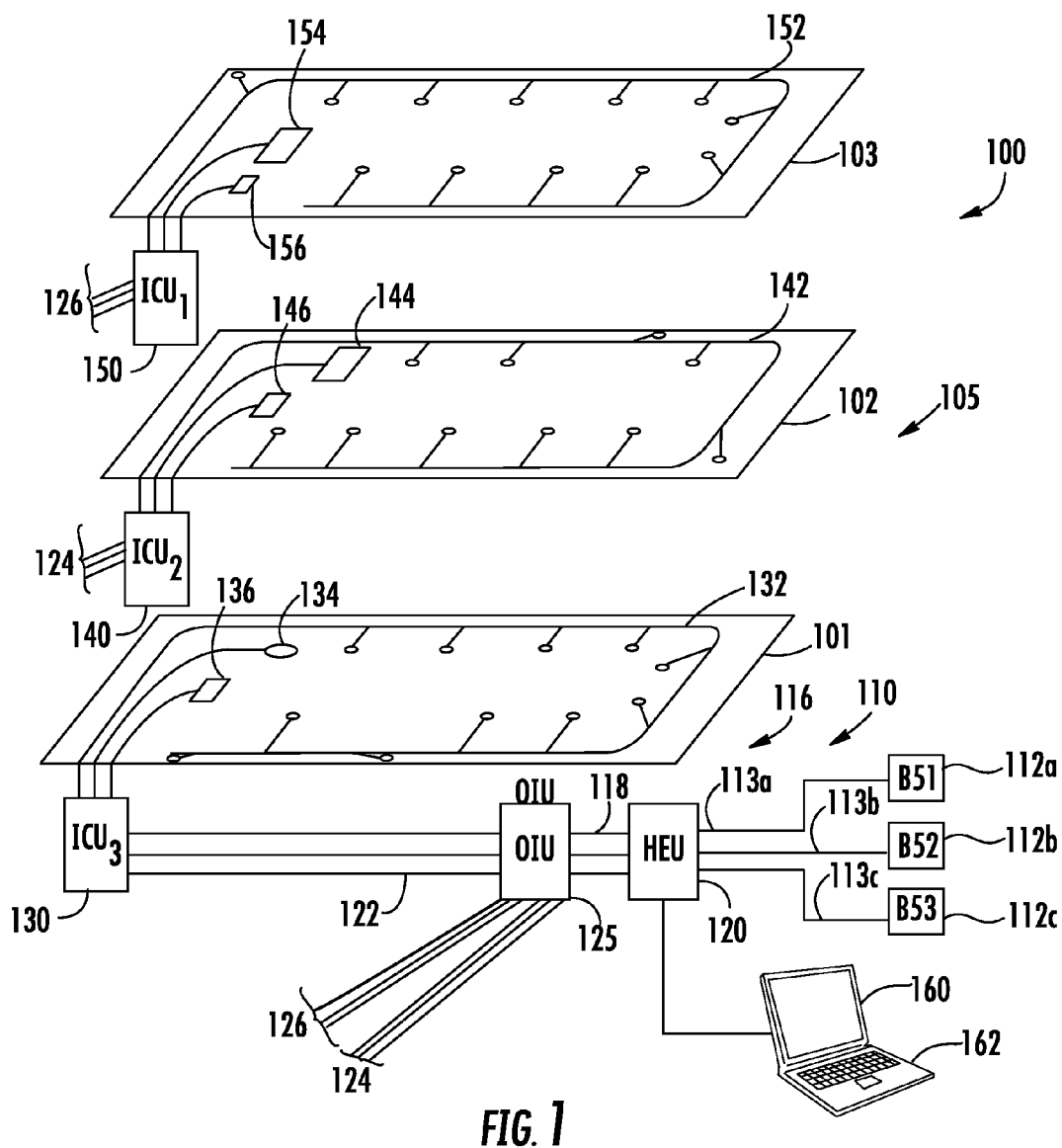
FIG. 1 depicts a schematic diagram of an exemplary distributed antenna system configured to distribute communications signals within an installation, such as a building. The communications signals illustratively includes digital data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The technology of this disclosure relates generally to reliability of antenna distribution systems using both optical fiber and metallic conductors, and more particularly to distribution and re-routing of communications services when a failure occurs.

Briefly stated, technologies are generally described for using optical and electrical transmission of a plurality of communications services from a plurality of outside sources to a network of users via a distributed antenna system. A distributed antenna system (DAS) includes a switching matrix of a plurality of programmable switches configured for connecting a plurality of communications services to a plurality of optical input modules (OIMs). Each of the plurality of services is provided through at least one sector. A plurality of radio distributor/combiner (RDC) modules is configured for combining the plurality of communications services into a broadband communication signal or for splitting a broadband communication signal into a plurality of communications services. A control module is configured for controlling routing of a second communications service of the plurality of communications services through the switching matrix to the plurality of OIMs to provide a substitute service for a first failed communications service of the plurality of communications services.

In describing more fully this disclosure, we make reference to the following definitions. By the term "communication service" is meant digital data services including but not limited to Ethernet, WLAN, Worldwide Interoperability for Microwave Access (WiMax), Radio over Fiber (RoF), Wireless Fidelity (WiFi), PCS band, 2G, 3G, 4G, GSM, Digital Subscriber Line (DSL), and Long Term Evolution (LTE), etc.

By the term "distributed antenna system" or DAS is meant an antenna system including a plurality of spatially separated antennas. The DAS may communicate with a variety of such commercial communications systems to distribute the services to clients within range of the distributed antenna system. The distributed antenna system may be an optical fiber-based distributed antenna system, but such is not required, and such systems may include both optical fibers and standard wired communications cables, such as those with copper conductors. It will be appreciated that the distributed antenna system may be a wire-based or a wireless system.

By the term "head end unit (HEU)" is meant a plurality of RDCs and a switching matrix for combining a plurality of communications signals into a broad band signal for further transmission, such as to an optical input unit, and for splitting a broadband signal from an optical input unit into individual communication signals, thus allowing two-way communications.

By the term "optical input unit (OIU)" is meant a plurality of RDCs and a switching matrix for transmitting a broadband electrical signal from a head end unit to a destination, such as to a plurality of optical input modules. The optical input unit also receives a plurality of broadband electrical signals from the plurality of optical input modules and transmits them in the opposite direction, such as to the head end unit, thus allowing for two-way communications.

By the term "radio distribution/combiner (RDC) is meant a device that combines narrowband signals into broadband signals and splits broadband signals into narrowband signals. The signals are illustratively electrical signals but may be an optical or other signal. The RDCs may be RDC cards, e.g., circuit boards with the appropriate combining and splitting functionality well known in the art By the term "optical input module" is meant a device that converts broadband electrical signals into broadband optical signals and vice versa.

By the term "remote antenna unit (RAU)" is meant a device connected to an optical input module that converts and filters a broadband optical signal into a narrow electrical signal and vice versa.

By the term "narrowband communication signals" is meant a specific band of frequencies of operation of a communication service that a provider is permitted to transmit under communication guidelines and permissions.

By the term "broadband communication signals" is meant a band of communication signals that is made up of two or more narrow bands of communication signals.

By the term "clients or recipients of these services" is meant devices such as cellular phones, smart phones, wireless computers, wireless lap-top computers, mobile devices such as tablet computers, pad computers, personal digital assistant, and wireless sensors or networks of sensors, such as mesh network sensors. These examples are not intended to be limiting, and the present disclosure is not limited to these examples of client devices.

This disclosure is generally drawn, inter alia, to methods, apparatus, systems, devices, and computer program products related to insuring the reliability of communications systems. In particular, the disclosure concerns the input and distribution of a wide variety of radio-frequency and digital communications to an area, such as a building. The area may be sufficiently large to require sub-division into a plurality of sectors, such as floors of the building, or other suitable subdivision.

In the present disclosure, each of these communications services is separately considered as a "service." As discussed below, the provision and distribution of each service is monitored to insure its reliability. The distribution of each service to one or more areas or "sectors" is monitored so that if a failure occurs, service to the affected sector can be quickly restored. Thus, the present disclosure concerns providing services to a plurality of "service/sectors," i.e., each service to each sector is considered separately, tracked and monitored. As will be seen in the discussion below, a first service, such as a WiFi service, may be labeled S1. The service may be provided to one or more areas or sectors, e.g., C1 or C2, such as the first and second floors of a building. In this disclosure, the provision of service S1 to the sector associated with the first floor is thus termed "S1C1," e.g., WiFi service to the first floor of the building, which may be a centrally-located hot spot. The same service may also be provided to the second floor, and thus would be termed "S1C2." These labels aid in discussing switching schemes and methods for tracking reliability, detecting failures, and restoring services to the affected sectors.

Turning now to the drawings, FIG. 1 depicts an example of a prior art distributed antenna system (DAS) 100 for a first 101, a second 102 and a third 103 floor, respectively, of a building 105. In this example a plurality of communications services 110 are provided, such communications coming from first, second and third base stations 112a, 112b 112c over cables 113a, 113b, 113c respectively. The services are input to a head end unit (HEU) 120 for routing through distributed antenna system 100. The distributed antenna system 100 is controlled by a computer 160 with operator input device 162. The computer may include local memory and may have access to remote memory, as well as computer programs stored on at least one non-transitory medium, either locally or remotely. The computer 160 may be connected directly to the head end unit 120 and may be in control of other elements of the distributed antenna system via wired connections or remotely, as shown. The computer system may also control an optical interface unit 125, which has been previously defined.

The communication services are illustratively routed through distributed antenna system 100 as shown in FIG. 1. Cable or hard wire outputs 118 from the head end unit 120 may connect to the optical input unit 125 and then to interconnect units 130, 140, 150 for serving the first, second and third floors 101, 102, 103 of building 105. Interconnect units 130, 140, 150 provide mechanical interfaces and power to the cable outputs from the interconnect units.

The computer 160 may be used to control the head end unit, the optical input unit and the interconnect units of the system. The computer may also control or monitor switches and switch matrices of the head end unit and optical input unit useful in operation of distributed antenna systems. The computer may be supplied with a non-transitory memory and a computer program useful for routing the signals through the system.

Within each floor, the services are then provided separately, as shown. Thus, the first floor 101 may be provided, through its interconnect unit 130, with an Ethernet wire distribution 132, a Wi-Fi hot spot 134, and a telecommunications antenna 136. In this example, similar services may be provided to the second and third floors 102, 103, through their interconnect units 140, 150 with Ethernet lines 142, 152, Wi-Fi hot spots 144, 154 and telecommunications antennas 146, 156.

Figure 2:
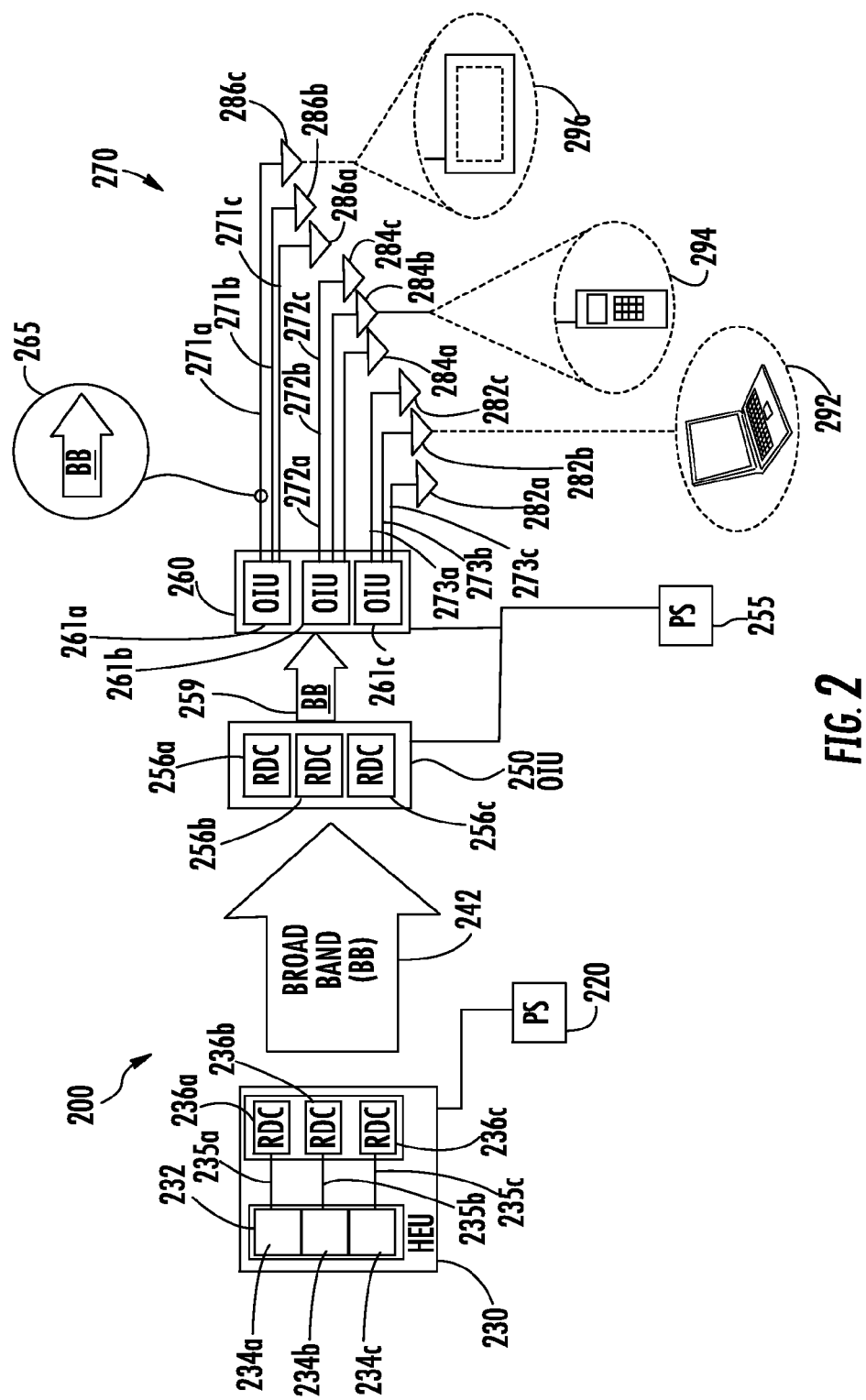
FIG. 2 depicts an alternate schematic view of a distributed antenna system for providing a plurality of communications services to a plurality of users.

FIG. 2 depicts an alternate view of a prior art distributed antenna system 200. In this view, head end unit 230 receives communications services inputs 234a, 234b, 234c which are applied over cables 235a, 235b 235c to a plurality of radio distributor/combiners/splitters (RDCs) 236a,b,c. These services are provided by base stations of service providers (not shown). The head end unit may also include a power supply or power source 220. The head end unit includes the plurality of radio distributor/combiners/splitters (RDCs) 236a, 236b, 236c for combining the signals into a broadband output signal 242 in one direction. RDCs may be RDC cards, e.g., circuit boards with the appropriate functions well known in the art. The RDCs also provide for splitting of a broadband input in the other direction. In other words, the RDCs split the broadband signal into its narrow band component parts for transmission in the opposite direction, thereby allowing for two-way communication.

In this embodiment, the broadband signal 242 is transmitted via cable (shown as element 118 in FIG. 1) to the optical input unit 250, which may also be equipped with a power source or power supply 255. Optical input unit 250 includes a second plurality of radio/distributor combiners (RDCs) 256*a*, 256*b*, 256*c*, which may be RDC cards, e.g., circuit boards with the appropriate functions well known in the art. In this embodiment, the RDC cards of the optical input unit 250 typically do not perform signal combining or splitting, although they may be capable of such action. The optical input unit 250 passes the broadband signal 259 to a plurality 260 of optical input modules (OIMs) 261*a*, 261*b*, 261*c*. As shown in FIG. 2, each OIM may service three remote antenna units (RAUs) with a broadband signal 265. Hence, the OIMs in this embodiment may serve up to nine clients.

As shown in FIG. 2, optical input module 261*a* has three outputs, 271*a*, 271*b*, 271*c* for sending broadband signal 265 to three remote antenna units 286*a*, 286*b*, 286*c*. Each optical input module further has an electrical to optical and an optical to electrical switching pair (not shown). More specifically, the broadband electrical signal 259 that is generated by RDC 250 and applied to optical input modules (OIMs) 261*a*, 261*b*, 261*c* is converted by the optical input modules into broadband optical signals 265 for transmission to the remote antenna units (RAUs).

At the RAUs the broadband optical signal is converted back into an electrical signal and filtered into a narrowband electrical signal which is transmitted to the clients. To effect the conversion at the RAUs of the optical signal to electrical signal and vice-versa, each remote antenna unit is likewise provided with an electrical to optical and an optical to electrical switching pair (not shown). Hence, the broadband optical signal 265 which is applied to each remote antenna unit is converted by the RAUs into a filtered electrical signal for transmission to clients 292, 294, 296 as shown. With client 292, which is illustratively a personal computer, the remote antenna unit provides the electrical signal as an Ethernet service. With clients 294 and 296 the electrical signal is wireless. These and other ways for delivering communication services to clients through a distributed antenna service are well known in the art.

As previously described, the communication services may be narrow band electrical signals provided by service providers over different bands of frequencies such as 400 MHz to 2700 MHz frequency range, such as 400-700 MHz, 700 MHz-1 GHz, 1 GHz-1.6 GHz, and 1.6 GHz-2.7 GHz, as examples. Radio Input Modules may be used as part of the service input.

The number of communication services, the number of OIMs, and the number RAUs are a matter of design.

Having thus provided an overview of a distributed antenna system, we now turn to features that are provided by this disclosure.

Figure 3:
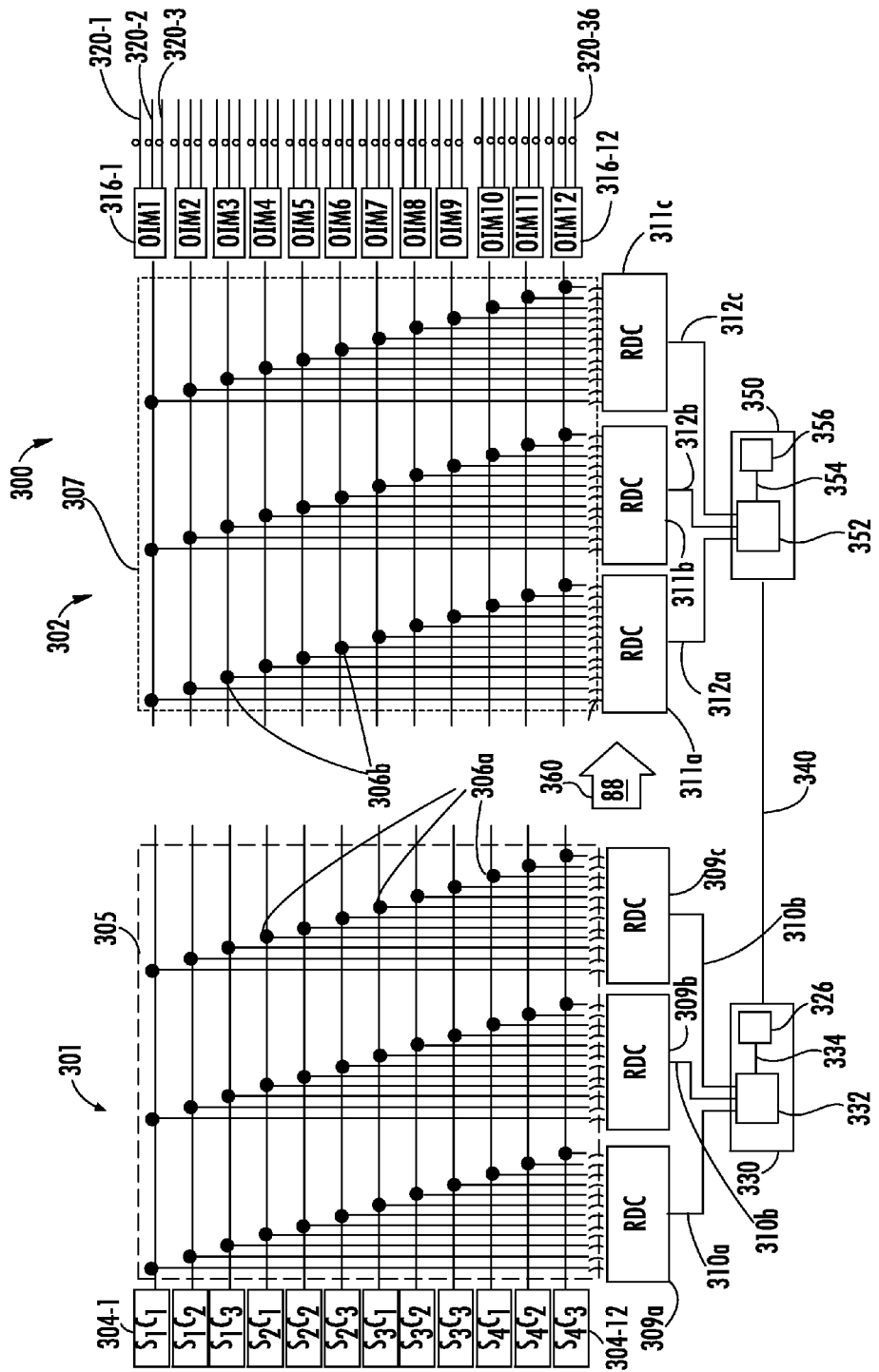
FIG. 3 is a block diagram of two functional blocks for a distributed antenna system (DAS), a head end unit (HEU) and an optical input unit (OIU)

FIG. 3 shows a distributed antenna system (DAS) 300 of this disclosure. DAS 300 comprises a head end unit 301 with a first plurality of radio distribution/combiners (RDCs) 309*a*, 309*b*, 309*c* and a first switching matrix 305 of a first plurality of programmable switches 306*a*. The distributed antenna system of FIG. 3 also includes an optical input unit 302 with a second plurality of radio distribution/combiners (RDCs) 311*a*, 311*b*, 311*c* and a second switching matrix 307 of a second plurality of switches 306*b*. Head end unit 301 also includes a plurality of service communications services 304 applied to input ports (not shown), and a plurality of outputs 316 applied to optical input modules (OIMs) 320. Head end unit 301 also includes a primary control module 330, including a microprocessor 332 in communication 334 with memory 336, for managing the head end unit and operating the switch matrix 305. Optical input unit (OIU) 302 also includes a secondary control module 350 with a microprocessor 352 in communication 354 with a memory 356 for controlling the optical input unit and its switching matrix 307. There is a hard-wire connections (not shown for simplicity) among each of the RDCs of the head end unit and among each of the RDCs of the optical input unit. These connections make it possible for additional routing of signals and services in the event of failures. Controllers 330, 350 may be hard wired 340 together as shown or may have a wireless connection in order to allow cross-talk between the controllers. The controllers manage the distributed antenna system and the switching matrices to work around failures and to provide reliable services. An IP connection protocol is used to govern the operation of the system in some embodiments.

The first plurality of radio distribution/combiners (RDCs) 309*a*, 309*b*, 309*c* is configured for connecting to a plurality of communications services. The services are shown as 304-1 through 304-12. RDCs 309*a*, 309*b*, 309*c* may be RDC cards (circuit boards) capable of combining and splitting signals of the plurality of services as previously described. In one embodiment, combining signals may be accomplished by superposition of the narrowband channels into a broadband output signal. Splitting of signals (in the opposite direction) may be accomplished by demultiplexing or filtering. Each of the plurality of communications services is provided through at least one sector as previously described. RDCs 309*a*, 309*b*, 309*c* are in communication with controller 330 via hard-wired connections 310*a*, 310*b*, 310*c*.

The second plurality of radio distribution/combiner (RDCs) 311*a*, 311*b*, 311*c* is connected with the first plurality of RDCs and are configured for connecting to a plurality of Optical Input Modules (OIMs) 316-1 through 316-12 for receiving the plurality of communications services. Each of the second plurality of RDCs is connected with one of the first plurality of RDCs, as shown later in the drawings. RDCs 311*a*, 311*b*, 311*c* are in communication with controller 350 via hard-wired connections 312*a*, 312*b*, 312*c*.

In one embodiment, RDCs 311*a*, 311*b*, 311*c* may also be RDC cards (circuit boards) but these RDCs unlike their counterpart RDCs 309*a*, 309*b*, 309*c*, do not have or do not use their capability to combine signals or split them out since the signal 360 applied to RDCs 311*a*, 311*b*, 311*c* is a broadband signal as are any signals being applied to the RDCs 311*a*, 311*b*, 311*c* from the OIMs 316. In the distributed antenna system, the optical input unit 302 transmits a broadband input signal to and from the head end unit and it passes a broadband signal to and from the plurality of OIMs 316-1 through 316-12.

Each OIM may service a plurality of remote antenna units (RAUs). As shown in FIG. 3, each OIM in this embodiment services three RAUs, 320-1 through 320-36. Other combinations may be used. In the event of failures, the OIMs and the RAUs may be tasked to provide additional services, up to their capacity, through the switching matrixes. This advantage of capacity steering of the distributed antenna system is explained later.

As indicated above, the head end unit 301 includes the first switching matrix 305 of a first plurality of programmable switches 306*a* for routing the plurality of communications services to the first plurality of RDCs. As also previously explained, the optical input module 302 further includes the second switching matrix 307 of a second plurality of programmable switches 306b for routing the plurality of communications services from the second plurality of RDCs 311a, 311b, 311c to the plurality of OIMs, each of the OIMs separately addressable by each RDC of the second plurality of RDCs.

The programmable switches 306a, 306b are managed by control modules 330, 350. More specifically, the memory 336, 367, in control modules 330, 350, respectively, include a program of instructions for managing which of the plurality of programmable switches 306a,b are on or off at any point in time. The switches of the plurality of switches that are turned on by the program of instructions at a point of time will define the route that the communication signals 304 will take through the head end unit and the optical input unit at that one point in time.

In particular, the distributed antenna system 300 is configured such that in the event of a failure of a first communications service, the control modules 330, 350 control routing of a second communications service through the switching matrices and RDC modules to at least one of the plurality of optical input modules (OIMs) to provide a substitute service for the first failed service. Specifically, the control modules will detect the failure of the first communication service based on signals provided by a detector as explained below, and in response turn off the switches that were previously set to route the first communication signal through the system. Illustratively, the control modules will then turn on programmable switches to allow the second communication service to be routed to the optical input modules (OIMs) that were previously provided with the first communication service. In this way, on failure of the first communication service this disclosure redistributes the second communication service such that it illustratively services not only to the OIMs previously serviced but also the OIMs that were affected by the failure of the first communication service.

In the distributed antenna system 300 of this disclosure, each of the plurality of communications services and sectors 304-1 through 304-12 may be routed in accordance with a primary path in addition to a number of redundant paths as explained below that may be stored in registers stored in memory 336, 356, respectively, in the control modules 330, 350. When the control module detects a failure of the first communication signal, the control module determines to use the second communication signal, for example, as the substitute communication for the failed communication signal. The program of instructions in memory then determine the redundant path for the second communication signal that will allow the second communication signal to also be provided to the OIMs experiencing the failed service. The program of instructions then sets the programmable switches in order to activate the redundant path so as to allow the second communication signal to be routed to the OIMs experiencing the failed service in addition to the continued routing of the second communication signal to the OIMs prior to the failure.

Before turning to specific examples of the routing and rerouting of communication services by this disclosure in response to a failure, we first explain further detail about the services and sectors that are distributed by the DAS of this disclosure so that the specific examples of using this disclosure are more readily apparent.

The distributed antenna system of the present disclosure is capable of providing a number of services, where each service S is an electrical signal for transferring data. Data may encompass voice and non-voice communications using a particular wireless technology, e.g. CDMA, in a particular frequency channel. It is understood that each Service uses its own channel with no overlap between channels. Each of the services may be provided through a number of sectors C, for example, as shown above, floors of a building, or portions of a floor, and so forth.

A sector C is an allocation of the service S into a manageable unit with all the sectors of a service being allocated throughout the system on a sector by sector basis. The sector C may be defined as a "sub-service" since it provides wireless connectivity using a certain wireless technology (e.g. CDMA) in a certain frequency channel. All sectors that belong to the same service use the same wireless technology (e.g. CDMA) but are usually separated by frequency or by code or by time or by other interference mitigation mechanism.

The distributed antenna system of this disclosure uses a plurality of antennas distributed across the building or other area for which service is being provided. The antennas may be grouped so that each group may serve a different area out of a number of areas of the building. Each group may serve different sets of sectors belonging to different services "Service/sector," which may be abbreviated as ServiceM/SectorN or SmCn, e.g., S1C1, S2C2, and so forth, in which the Service (type of communication) is designated as S and the particular sector (e.g., floor or other area) is designated as C.

In one example, a large building is divided to three areas. Each area is served by a different group of antennas and each group of antennas is serving a different set of Service/Sectors. For example: the antennas in floors 1-5 may form a group A1 serving service 1 sector1 and service 2 sector 1 (S1C1; S2C1), the antennas in floors 6-10 may form a group A2 serving service 1 sector2 and service 2 sector 3 (S1C2; S1C2), the antennas in floors 11-15 may form a group A3 serving service 1 sector3 and service 2 sector 3 (S1C3; S1C3).

In terms of the architecture to implement the foregoing allocation of services/sectors, a system according to the present disclosure may use two modules shown in FIG. 3; namely, the head end unit 301 and its switch matrix 305 and the optical input unit 302 and its switch matrix 307. Head end unit 301 may be located near the communications base station service inputs, as shown, for example, for head end unit 120 in FIG. 1. The head end unit may comprise a plurality of RDC elements, as previously discussed, for example an RDC element in communication with an optical input unit and an interconnection unit on each floor or near each service area. The head end unit is used for connecting the distributed antenna system to the base stations or more specifically to the Service/Sector ports to which communication services 304-1 to 304-12 are applied. The Service/Sector ports are connected to Radio Distributer/Combiner (RDC) elements 308a, 308b, 308c.

The number of RDC's that the HEU and the OIU include determines the number of the different basic "service/sector" combinations that the DAS supports. According to the example provide in FIG. 3, three RDC's are used in the HEU and in the OIU, which enables the creation of three basic "service/sector" combinations (M). With M basic ways to order the RDCs in delivering service/sector combinations, it is possible to create M! or six different ways in which to order the RDCs, that is, configure the order of the RDCs, to deliver services to Areas 1, 2, 3 (shown in FIG. 5). Each "Service/Sector" 104 may be connected through a software controlled switch 306a, 306b to each of the RDC's. This allows to route to each of the RDC's any combination of "service/sectors."

Figure 4:
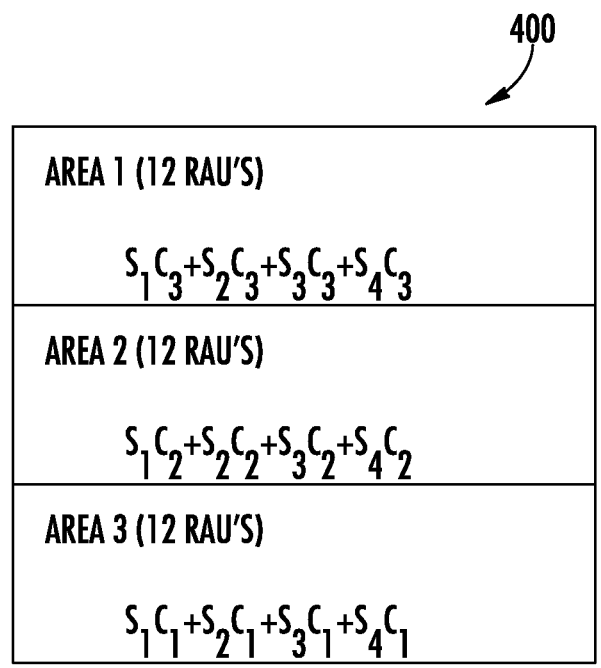
FIG. 4 depicts schema for communications services, such as for a building, using building blocks for services (s) and sectors (c)

With the foregoing background on delivery of communications services/sectors throughout a building and still referring to FIG. 3, we turn now to control modules 330, 350, respectively and more particularly to the program of instructions for managing which of the plurality of programmable switches 306a, 306b are on or off at any point in time. FIG. 4 depicts an illustrative schema for communications services, such as for a building, using building blocks for services (s) and sectors (c). In this schema, the building is divided into three areas where each area is served by twelve RAUs. The three areas may be, for example, floors of a three-floor building. Each of the RAUs at each of the areas is serving four services S1, S2, S3 and S4. However in each area different sectors of these services are provided. At area 1: $S_1C_3+S_2C_3+S_3C_3+S_4C_3$; at area 2: $S_1C_2+S_2C_2+S_3C_2+S_4C$; and at area 3: $S_1C_1+S_2C_1+S_3C_1+S_4C_1$. One head end unit 301 and one optical input unit 302 are illustratively used to build this distributed antenna system.

Figure 5:
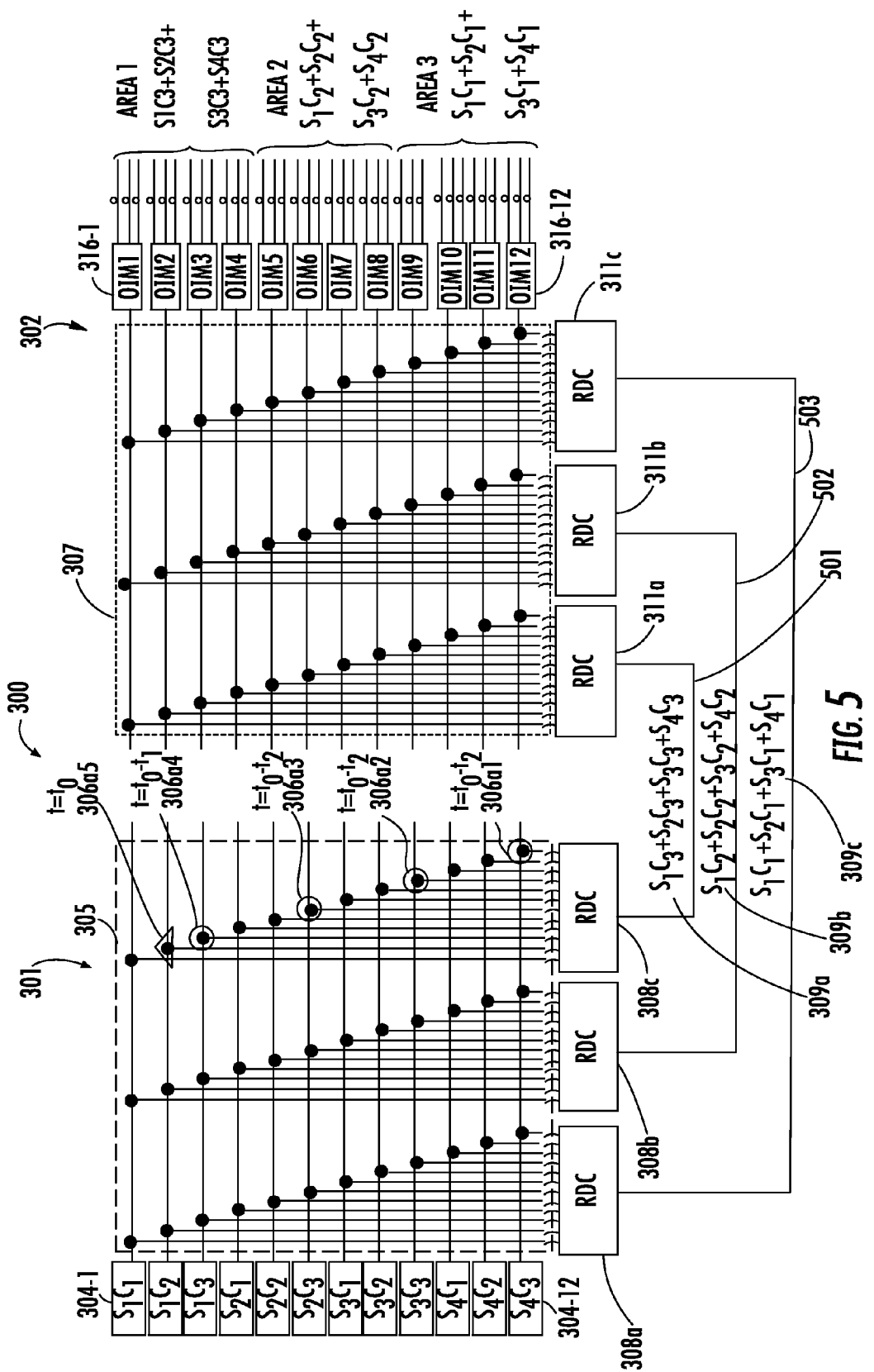
FIG. 5 depicts an implementation of a distributed antenna system for a building, using the structure of FIG. 3, a head end unit and an optical input unit, and the schema of FIG. 4.

FIG. 5 shows the interconnection between a head end unit (HEU) 301 and an optical input unit OIU 302 and the constellation of the HEU and the OIU switch matrixes 305, 306 required for structuring the distributed antenna system DAS 300 according to the schema of FIG. 4. The distributed antenna system 300 interconnections between the head end unit 301 and the optical input unit 302 and the head end unit and optical input unit switch matrixes 305, 307. The elements in FIG. 5 are very similar to like elements in FIG. 3, except for the individual connections 501, 502, 503 between RDCs 308a-311c, 308b-311b and 308c-311a. The connections are also labeled with the particular Service/Sectors that are broadband connected through these connections. Note that in this embodiment, each RDC connected pair handles a broadband signal, but each is different. Each broadband signal includes communication services S1, S2, S3, and S4; however, the sectors C found in the communication services for each broadband signal is different. For example, broadband signal 309a includes sector C3, broadband signal 309b includes sector C2, and broadband signal 309c includes sector C1. These particular Services/Sectors that are connected for combining in the particular RDC are selected by a controller 330 or 350 (shown in FIG. 4). In one embodiment, the connections between RDCs 308a, 308b, 308c and RDCs 311a, 311b, 311c are made by metallic lines, e.g., copper.

The distributed antenna system DAS 300 in FIG. 5 serves three areas: namely, Area 1 is served by four OIMs, 316-1 through 316-4; Area 2 by four OIMs; and Area 3 by four OIMs. Each OIM can handle three remote antenna units, for a total of twelve RAUs for Area 1; twelve RAUs for Area 2; and twelve RAUs for Area 3. There are 36 RAU's possible by the illustrated architecture of FIG. 6. The twelve RAUs in each Area receive a broadband optical signal made up of four narrow band optical signals. For example, the broadband signal delivered to each of the twelve RAUs in Area 1 may contain S1C3, S2C3, S3C3, S4C3. Each of the twelve RAUs in Area 1 will be configured to filter out all but one of the narrow band signals so that only one of S1C3, S2C3, S3C3, and S4C4 will be delivered to the portion of the Area associated with an RAU. Of course, the RAU will convert the optical signal to an electrical signal so that the signal delivered to the portion of the Area associated with the RAU is an electrical signal.

So long as all of the services and sectors transmitted to each OIM 316 is delivering services adequate for their use, there may be no problem with distributed antenna system DAS 300. But if there is a failure in one of the signals being transmitted to each OIM 316, the result may be dropped calls, poor reception, and other communication efficiencies. These failures may include the cessation of a service altogether. Alternatively, it may include the inability of the bandwidth provided to an Area to support the communication requirements of that Area. For example, if a conference with many attendees is scheduled for Area 1, if there is not enough bandwidth to enough bandwidth to serve all the attendees, the distributed antenna system DAS 300 will have failed.

The control modules 330, 350 of this disclosure monitor failures of this and other kinds that are detected by devices described below and provide capacity steering to reroute one or more other communication signals to the Area of the failure in order to offset the communication deficiencies attributed by the failure and to preferably provide as uninterrupted a service to the Area of the failure as may be possible.

Figure 6:
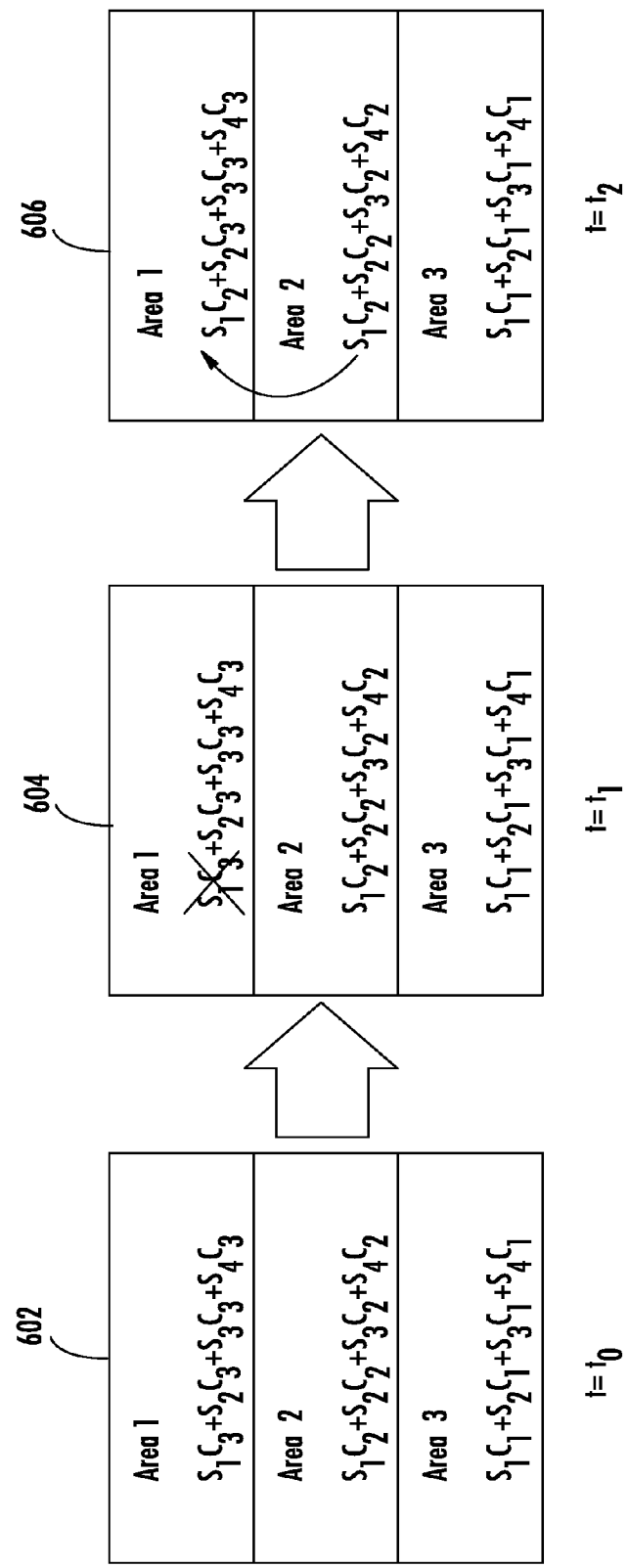
FIG. 6 uses the implementation of FIG. 5 to depict an example of a failure in a single service/sector and a possible recovery scheme to minimize any interruption of communications services to the affected service/sector.

FIG. 6 illustrates one way in which capacity steering of this disclosure may be used to address a failure. In particular, FIG. 6 shows a group of services shown in a schema 602 being transmitted to Areas 1, 2, 3. In this schema, control modules 330, 350 and more particularly the program of instructions for managing which of the plurality of programmable switches 306a, 306b are on or off at any point in time have set the programmable switches 306a1-4 of switching matrices 306a and programmable switches 306b1-4 of switching matrices 306b to provide a route of services S1C3, S2C3, S3C3, and S3C4 to Area 1 at time t=t0. Note that RDC 308c which is connected to the programmable switches 306a1-306a4 is connected to RDC 311a which is connected to programmable switches 306b1-306b4 in this example. Also, as previously indicated, these narrowband services of each of S1C3 and S2C3 and S3C3 and S4C3 will be combined by RDC 308c in this example into a broadband electrical signal S1C3+S2C3+S3C3+S4C3 and delivered as a broadband electrical signal to each of the four OIMs that service Area 1. Each OIM will convert the broadband electrical signal to a broadband optical signal and apply that broadband signal to each RAU connected thereto. Each RAU will in turn filter the narrowband optical signal that it is programmed to deliver and convert that optical signal to an electrical signal. Each RAU will then transmit that electrical signal to the portion of the area it is designed to cover.

Illustratively, at all or substantially all times, the control modules 330, 350 are monitoring the foregoing services. While at time t=t0, all communication services S1C2, S2C3, S3C3, and S4C3 are operational as shown in schema 602 in FIG. 6, at time t−t1 a failure of service S1C3 has occurred as shown in schema 604. More specifically, schema 604 in FIG. 6 shows that at time t=t1, the control modules have detected a failure of service S1C3. In response, as shown in schema 606, at time t=t2, the control modules 330, 350 disconnects service S1C3 and connects service S1C2 in its place. Hence, whereas at time t−t1 there was a failure in the communication services being provided by the DAS, at time t=t2, the DAS of this disclosure has corrected that failure by replacing the broadband electrical signal S1C3+S2C3+S3C3+S4C3 that included the failed S1C3 communication signal with a new broadband signal of S1C2++S2C3+S3C3+S4C3 that includes an operational service S1C2 to deliver to the clients in Area 1. By this disclosure, the failure of service S1C3 was detected by control modules 330, 350 and the broadband services transmitted to Area 1 was reconfigured by programming switch 306a4 OFF at time t=t2 as shown in FIG. 5 for the purposes of disconnecting service S1C3 from the communication path to Area 1, and programming switch 306a5 ON at time t=t2 as also shown in FIG. 5 for the purposes of connecting service S2C3 to a communication path to Area 1 as shown in FIG. 5. Hence, by this disclosure, operational service S1C2 was used to replace the failed service S1C3 in the broadband service delivered to Area 1 after the failure.

Figure 7:
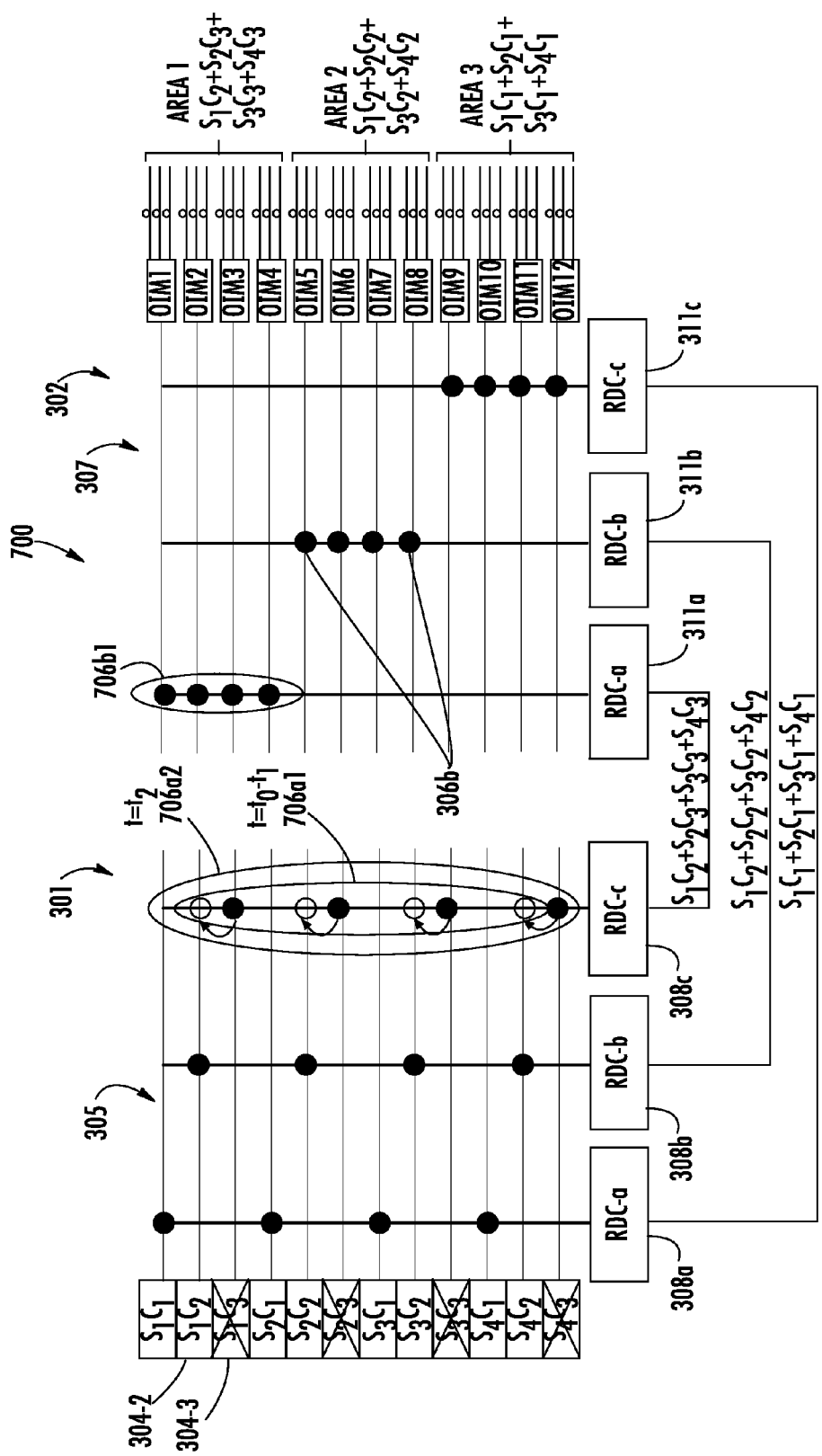
FIG. 7 is a schema for communications services that continues with the example of the failure depicted in FIG. 6, depicting a change in the head end unit RF matrices switching scheme following the failure.
Figure 8:
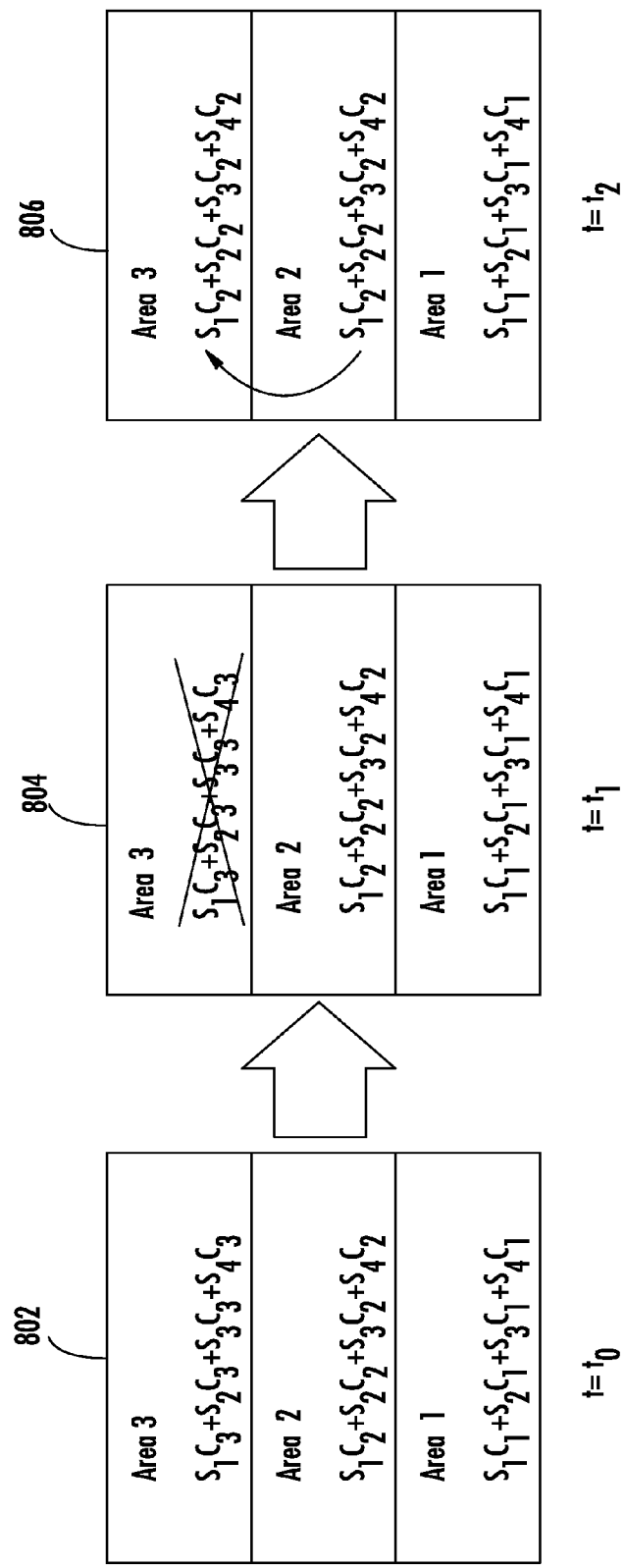
FIG. 8 depicts another example of a failure, this time a broader failure of a combination of services for an area, and a possible recovery scheme to minimize interruption of communications services to the entire sector.

FIG. 7 shows the interconnection between a head end unit (HEU) 301 and an optical input unit OIU 302 and the constellation of the HEU and the OIU switch matrixes 305, 307 required for structuring the distributed antenna system DAS 300 according to another schema shown in FIG. 8. The distributed antenna system 300 interconnections between the head end unit 301 and the optical input unit 302 and the head end unit and optical input unit switch matrixes 305, 307 in FIG. 7 are very similar to like elements in FIG. 5.

FIGS. 7 and 8 illustrate another way in which capacity steering of this disclosure may be used to address a failure. In particular, FIG. 8 shows a group of services shown in a schema 802 being transmitted to Areas 1, 2, 3. In this schema, control modules 330, 350 (shown in FIG. 5) and more particularly the program of instructions for managing which of the plurality of programmable switches 306a, 306b are on or off at any point in time have set programmable switches of switching matrices 306a and programmable switches of switching matrices 306b to provide a route of services S1C3, S2C3, S3C3, and S3C4 to Area 1 at time t=t0. Note that RDC 308c which is connected to a cluster of programmable switches 706a1 is connected to RDC 311a which is connected to a cluster of programmable switch 706b1 in this example. Also, as previously indicated, these narrowband services of each of S1C3 and S2C3 and S3C3 and S4C3 will be combined by RDC 308c in this example into a broadband electrical signal S1C3+S2C3+S3C3+S4C3 and delivered as a broadband electrical signal to each of the four OIMs that service Area 1. Each OIM will convert the broadband electrical signal to a broadband optical signal and apply that broadband signal to each RAU connected thereto. Each RAU will in turn filter the narrowband optical signal that it is programmed to deliver and convert that optical signal to an electrical signal for transmission to the portion of the area it is designed to cover.

Illustratively, at all or substantially times, the control modules 330, 350 are monitoring the foregoing services. Schema 802 shown in FIG. 8 shows that at time t=t0 all services are operational. Schema 804 shows that at time t=t1, the control modules have detected a failure of all four narrowband services S1C3+S2C3+S3C3+S4C3. In response, at time t=t2, the control modules 330, 350 disconnect all four of the failed services S1C3+S2C3+S3C3+S4C3 and connect services S1C2+S2C2+S3C2+S4C2 in their place as shown in schema 806. Hence, at time t=t2, the broadband optical signal is no longer S1C3+S2C3+S3C3+S4C3. Rather, the broadband optical signal is now made up of narrow bands S1C3+S2C3+S3C3+S4C3. This is shown in FIG. 7 of the DAS of this disclosure by turning OFF the cluster of programmable switches 706a1 at time t=t2 (i.e., the switches that connect S1C3+S2C3+S3C3+S4C3 to Area 1) and turning ON the cluster of programmable switches 706a2 (i.e., the switches that connect S1C2+S2C2+S3C2+S4C2 to Area 1) to provide the substitute service.

By this disclosure, the failure of services S1C3+S2C3+S3C3+S4C3 was detected by control modules 330, 350 and the broadband services that were transmitted to Area 1 were reconfigured by programming OFF of the switches that routed S1C3+S2C3+S3C3+S4C3 to Area 1 and programming ON of the switches that caused services S1C2+S2C2+S3C2+S4C2 to be rerouted to provide services to Area 1 in place of the failed services in addition to continuing to service Area 2.

Figure 9:
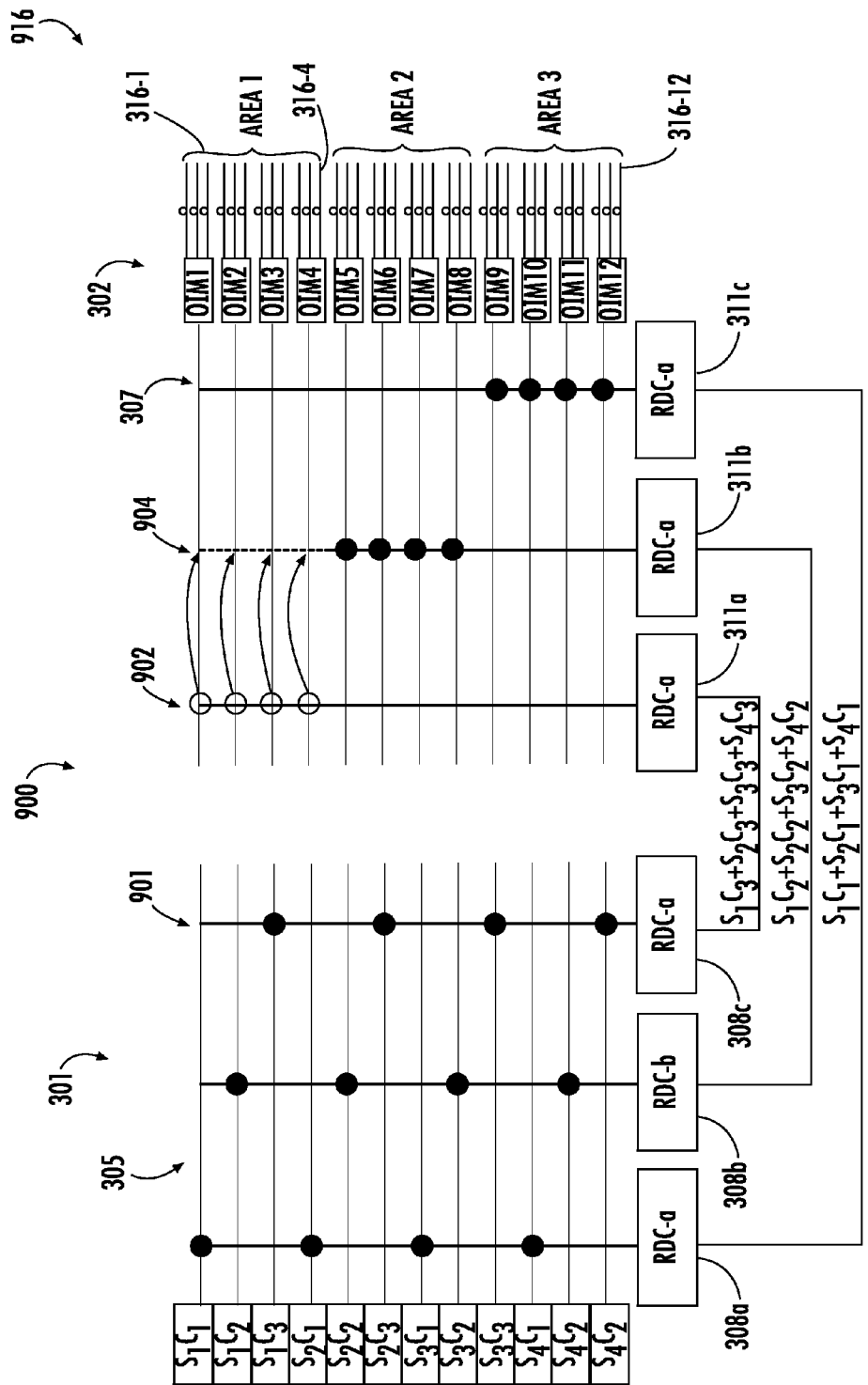
FIG. 9 continues with the example of the failure of FIG. 8, depicting the change in switching scheme following this wider failure.

FIG. 9 shows the interconnection between a head end unit (HEU) 301 and an optical input unit OIU 302 and the constellation of the HEU and the OIU switch matrixes 305, 306 required for structuring the distributed antenna system DAS 300 according to another schema. The distributed antenna system 300 interconnections between the head end unit 301 and the optical input unit 302 and the head end unit and optical input unit switch matrixes 305, 306 in FIG. 9 are very similar to like elements in FIG. 7.

Figure 10:
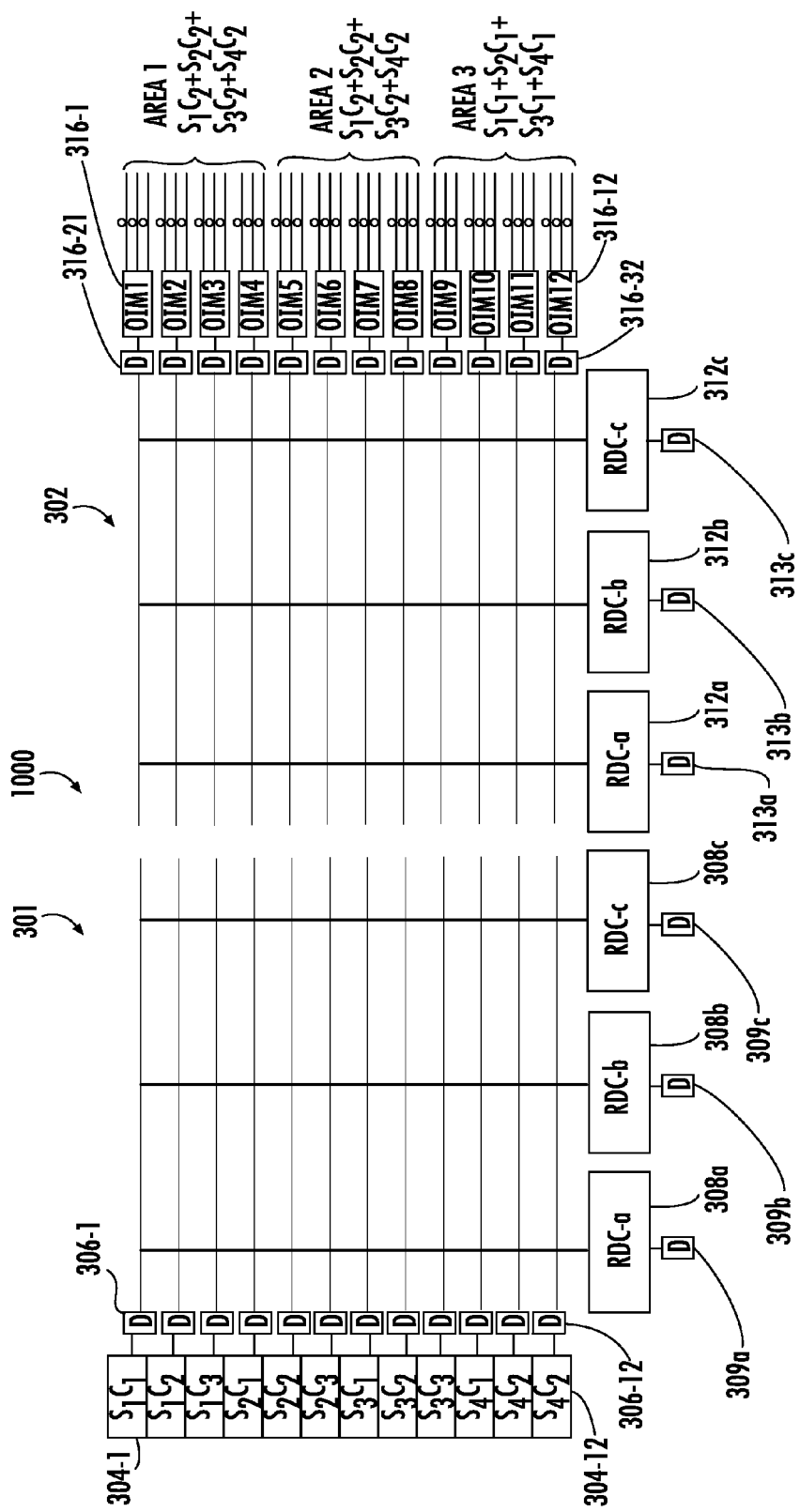
FIG. 10 depicts possible locations of power detectors to detect failures within the distributed antenna system, so as to indicate whether a single service, a single sector, or a combination of services/sectors has failed.

FIGS. 9 and 10 illustrate another way in which capacity steering of this disclosure may be used to address a failure. In particular, FIG. 9 shows the group of services shown in schema 802 shown in FIG. 8 being transmitted to Areas 1, 2, 3. Here, the failure occurs in the switching matrices of the optical input unit OIU 307.

Illustratively, at all or substantially all times, the control modules 330, 350 are monitoring the foregoing services. On detection by the control module of the failure of the broadband services S1C3+S2C3+S3C3+S4C3, the control modules 330, 350 turns off programmable switches 902 and turns on programmable switches 904 so that the broadband optical services of S1C2+S2C2+S3C2+S4 C2 may be applied to the OIMs servicing Area 1 to provide for illustratively uninterrupted service in its place as shown in schema 804. Hence, at time t=t2, the broadband optical signal is no longer S1C3+S2C3+S3C3+S4C3. Rather, the broadband optical signal is made up of narrow bands S1C3+S2C3+S3C3+S4C3. By this disclosure, the failure of services S1C3+S2C3+S3C3+S4C3 in the optical input unit OIU 307 were detected by control modules 330, 350 and the broadband services transmitted to Area 1 reconfigured by programming OFF of switches 902 which routed services S1C3+S2C3+S3C3+S4C3 to Area 1 and programming ON switches 904 which caused services S1C2+S2C2+S3C2+S4C2 to be rerouted to provide services to Area 1 in place of the failed services in addition to continuing to service Area 2.

FIG. 10 depicts one embodiment of a distributed antenna system 1000 with detectors. Distributed antenna system 1000 includes one head end unit (HEU) 301 and an optical input unit (OIU) 302, each of which includes a switching matrix, as described above but not shown in FIG. 10. In this embodiment, each Service/Sector input 304-1 through 304-12 also includes a detector 306-1 through 306-12, as shown. The detectors are shown in series with the service/sector inputs. The head end unit 301 is depicted as connected through its RDCs 308-a, 308-b, 308-c and also with detectors 309a, 309b, 309c for detecting a failure in the RDCs. The optical input unit 302 includes detectors 313a, 313b, and 313c for detecting failures in RDCs 312a, 312b, 312c. In a similar manner, detectors 312-21 through 312-32 are depicted in series with optical input modules 316-1 through 316-12 of the optical input unit 302.

One straightforward way to detect connection failure for the optical input modules is to simply adapt the detectors as power detectors. If no power is consumed at all, there has been a failure of connection or of input, since normal polling or checking will reveal a problem. For example, operation of the E/O and O/E converters requires operation of lasers to create an optical signal in the E/O conversion. Conversion the other way, from optical to electrical, requires a photodetector. If no power is consumed either way, there is likely a failure. The system can also use periodic checks to insure that all connections are up and running.

The same situation applies to the service/sector detectors 304-1 to 304-12. If there is no communication at all between the signal inputs to the building and the Service/Sector input to the head end unit, there is likely a problem, either a broken connection or a failure of the input communications mode. For optical portions, a photodetector can determine whether optical inputs or outputs are operable. For electrical portions, a power meter or a detection circuit on the lasers may be sufficient. Other ways may be used to detect, such as the presence or absence of a voltage on a line to determine whether a signal is connected or is active.

Figure 11:
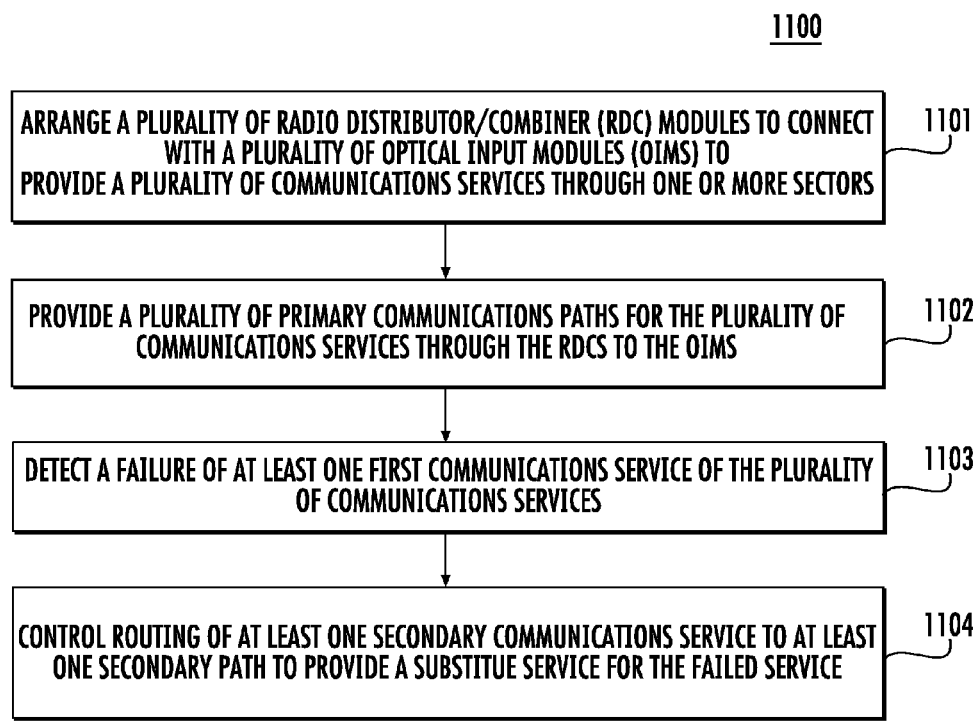
FIG. 11 is a flowchart depicting one method for minimizing communications interruptions according to the present disclosure.

Two flowcharts are presented to illustrate ways in which the distributed antenna system of the present disclosure may be used. The first flowchart is depicted in FIG. 11, for a method 1100 of minimizing communications interruptions and insuring reliability. The method arranges a plurality of communications services to an area, such as a building or a particular business or entity. The communications services may be provided through over-the-air antennas, wired or optical cable, or a combination of these. A first step 1101 of the method is to arrange a plurality of radio distributor/combiner modules to connect with a plurality of optical input modules (OIMs) to provide a plurality of communications services through one or more sectors. The second step 1102 of the method is to provide a plurality of primary communications paths for the plurality of communications services through the RDCs to the OIMs. A failure is detected 1103 of at least one communications service of the plurality of communications services. The routing of a secondary communications service to at least one secondary path is then used 1104 to provide a substitute service for the failed service.

Figure 12:
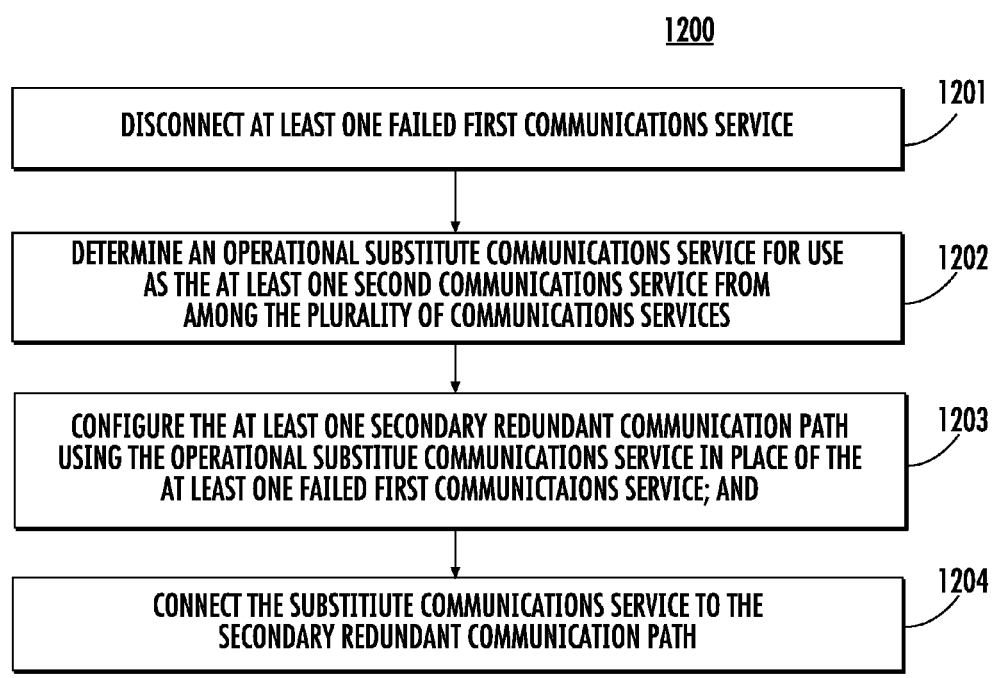
FIG. 12 is an additional flowchart depicting an alternate method for minimizing communications interruptions according to the present disclosure; all figures are arranged according to at least some embodiments presented herein.

Another method is disclosed in the flowchart of FIG. 12. In this method 1200, a first step 1201 is to disconnect at least one failed first communications service. In order to restore service, one then determines 1202 an operational substitute communications service for use as the at least one second communications service from among the plurality of communications services. Before restoring a failed service, a suitable substitute service must be determined, as described herein. In order to provide this service, one then configures 1203 the at least one secondary redundant communication path using the operational substitute communications service in place of the at least one failed first communications service. With everything ready, the substitute communications service is then connected 1204 to the secondary redundant communications path. There are many other ways to operate the distributed antenna system to provide reliable communications services.

The RDCs of this disclosure may combine or split their input electrical signals in any practical and desirable manner. These include all possible multiplexing methods, such as frequency division, code division, time division, hybrid frequency/time based multiplexing, and so forth. Several such techniques are well known in the art. There same techniques may be used in the remote antenna units to combine and split the optical signals for uplink or downlink transmission, respectively In view of this disclosure, it will be seen that technologies are generally described for improving the reliability of communications services within an area or a building served by a distributed antenna system.

There are many embodiments of the present disclosure, of which a few additional are presented here. A first embodiment, as described above, includes a distributed antenna system with a first plurality of RDCs, a second plurality of RDCs, a first switching matrix and a second switching matrix. This first embodiment also includes a control module configured for routing the plurality of communications services to the first plurality of RDCs and for routing the plurality of communications services to the plurality of OIMs, wherein the control module is configured, in the event of a failure of a first communications service, for controlling routing of a second communications service through the RDC modules and the switching matrices to at least one of the plurality of optical input modules (OIMs) to provide a substitute service for the first failed service. Another embodiment of the system further includes a plurality of detectors configured to detect that the first communications service of the plurality of communications services has failed.

In another embodiment, the failure of the first communications service of the plurality of communications services is a failure of a connection of the first communications service of the plurality of communications services to at least one of the plurality of OIMs. In another embodiment, the control module further includes hardware and software for controlling the routing; in this embodiment. The controlled routing disables a first communication path for the first failed communications service and connects a second communication path for the second communications service of the plurality of communications services to provide the substitute service. In this embodiment, the switching matrix is further configured for controlling routing of a second of the plurality of communications services through the RDC modules to the plurality of optical input modules (OIMs) to provide a substitute service for a second failed service.

In another embodiment, the plurality of RDC modules includes a first plurality of RDC modules connected to a second plurality of RDC modules. The distributed antenna system further includes a head end unit (HEU) module including the first plurality of RDC modules and the first switching matrix of the plurality of programmable switches. The HEU is configured for connecting the plurality of communications services to the first plurality of RDC modules through the first switching matrix and an optical interface unit (OIU) module including the second plurality of RDC modules and the second switching matrix of the plurality of programmable switches. The OIU is configured for connecting the second plurality of RDC modules to the plurality of OIMs through the second switching matrix. In another embodiment, the plurality of OIMs are connected to a plurality of clients. In one embodiment, the plurality of clients are wireless devices selected from the group consisting of cellular phones, smart phones, wireless lap-top computers, tablet computers, pad computers and sensor networks. In yet another embodiment, the plurality of communications services comprises at least two services selected from the group consisting of WiFi, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM and WLAN.

In another embodiment, the distributed antenna system is configured to serve a geographic area selected from the group consisting of a building, an area of a building and one or more rooms of a building. Another embodiment that includes the plurality of detectors described above, further includes a network configured for providing the plurality of communications services, wherein the control module is in communication with the network. In this embodiment, the detection by the plurality of detectors that the first of the plurality of communications services has failed further includes detecting at the network whether the first of the plurality of communications services has failed and communicating the detected failure at the network to the control module. In another embodiment that includes the detectors, each of the plurality of RDC modules, each of the plurality of OIM modules and each of the plurality of communications services are in communication with at least one of the plurality of detectors. In this embodiment, the detection by the plurality of detectors that the first communications service has failed includes the step of detecting with at the at least one detector whether a current, voltage or power level of the first communications service has dropped below a predetermined level, the predetermined level being indicative of a failure of the first communications service.

In another embodiment, the control module is configured for determining that at least one communications service of the plurality of communications services is operational by determining available bandwidth of the at least one communications service and controlling switching to provide a path of the least one operational service to the first OIM of the plurality of OIMs based upon the available bandwidth. In this system, the step of providing the path based upon the available bandwidth further includes obtaining configuration data associated with a client, determining one or more communications services connected to the OIM that the client is authorized to access, and controlling switching to provide a path of the least one operational service to the first OIM of the plurality of OIMs based upon the access authorization of the client.

Already described above is another illustrative embodiment of a distributed antenna system. This illustrative embodiment include a first plurality of RDCs, a second plurality of RDCs, first and second switching matrices, and a control module. In another embodiment, further includes a head end unit (HEU), the HEU including the first plurality of RDCs and the first switching matrix and an optical input unit (OUI), the OIU including the second plurality of RDCs and the second switching matrix, the first plurality of RDCs are further configured for combining the plurality of communications services into a broadband communication signal or for expanding the broadband communication signal into a plurality of communications services. In another embodiment, each of the plurality of communications services has a number of redundant paths through the first switching matrix equal to a quantity of communications sectors times a quantity of the first plurality of RDCs. In this embodiment, each of the plurality of OIMs has a quantity of redundant paths through the second switching matrix equal to a quantity of communications sectors times the second plurality of RDCs.

Another embodiment described above is a method for controlling a distributed antenna system. The method includes steps of arranging a plurality of radio distributor/combines modules, providing a plurality of primary communications paths, detecting a failure of at least one first communications service of the plurality of communications services, and controlling routing of at least one second communications service of the plurality of communications services from the plurality of primary communication paths to at least one secondary redundant path to provide a substitute service for the failed first communications service. In another embodiment, the plurality of RDC modules includes a first plurality of radio distributor/combiner (RDC) modules and a second plurality of RDC modules, wherein the first plurality of RDC modules are configured for connecting the plurality of communications services with the second plurality of RDC modules and for combining the plurality of communications services into a broadband communication signal or for expanding the broadband communication signal into a plurality of communications services and wherein the second plurality of RDC modules are configured for connecting the broadband communication signal with the plurality of OIMs.

In another embodiment, the method further includes restoring the at least one first failed communications service, controlling switching of the at least one second communications service from the at least one secondary redundant communication path back to the plurality of primary communication paths, and controlling switching of the at least one first failed communications services on the plurality of primary communication paths. This method optionally may include steps of disconnecting the at least one failed first communications service, wherein the step of controlling routing of at least one second communications service of the plurality of communications services from the plurality of primary communication paths to at least one secondary redundant path further includes determining an operational substitute communications service for use as the at least one second communications service from among the plurality of communications services, configuring the at least one secondary redundant communication path using the operational substitute communications service in place of the at least one failed first communications service and connecting the substitute service to the secondary redundant communication path.

In another embodiment, the plurality of communications services through the plurality of RDC modules to the plurality of OIMs further includes a third communications service to the first OIM of the plurality of OIMs; this embodiment of the method further includes detecting an occurrence that the third communications service has failed and controlling routing of the at least one second communications services from the plurality of primary communication paths to the plurality of secondary paths to provide a substitute service for the failed third communications service.

Another embodiment includes additional steps of determining available bandwidth of a plurality of communications services remaining operational after the first communications service has failed and selecting the at least one second communications services for routing to the plurality of secondary communication paths based upon the available bandwidth. In this embodiment, the step of determining the available bandwidth optionally further includes obtaining configuration data associated with a remote antenna unit and a client of the failed first communications services, determining the one or more communications services connected to the second plurality of RDC modules that the client is authorized to access and selecting at least a second of the plurality of communications services for routing to the plurality of secondary communication paths based upon the available bandwidth and based upon the access authorization of the client of the at least one failed communications service. In this method, the step of detecting the occurrence of the failure of the at least one first communications services optionally further comprises detecting whether the at least one first communications service has failed at a network input. In an alternative method, the step of detecting the occurrence of the failure of at the least one first communications service is accomplished by a customer complaint.

The embodiments disclosed herein are also applicable to other remote antenna clusters and distributed antenna systems, including those that include other forms of communications media for distribution of communications signals, including electrical conductors and wireless transmission. The embodiments disclosed herein may also be applicable to remote antenna clusters and distributed antenna systems and may also include more than one communications media for distribution of communications signals (e.g., digital data services, RF communications services).

Additional features and advantages will be set forth in the detailed description which follows, and in part will be readily apparent to those skilled in the art from that description or recognized by practicing the embodiments as described herein, including the detailed description that follows, the claims, as well as the appended drawings. It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed These methods include operating the distributed antenna system (DAS) and insuring that connectivity and service are restored as soon as possible after any and all interruptions. Thus, the system includes ways to overcome and correct failure of the distributed antenna system using a software based recovery application. The software program contains non-transitory instructions for detecting failures and operating switching matrices within the head end unit 120 and the remote optical input units (OIU) that are more fully described below.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A distributed antenna system (DAS), comprising:
   a first plurality of radio distribution/combiners (RDCs) configured for connecting to a plurality of communications services, each of the plurality of communications services provided through at least one sector;
   a second plurality of RDCs connected with the first plurality of RDCs, the second plurality of RDCs configured for connecting to a plurality of Optical Input Modules (OIMs) for receiving the plurality of communications services, each of the second plurality of RDCs connected with one of the first plurality of RDCs;
   a first switching matrix of a first plurality of switches connected at a first end to the plurality of communications services and at a second end to the first plurality of RDCs for routing the plurality of communications services to the first plurality of RDCs, each of the second plurality of RDCs separately addressable by one RDC of the first plurality of RDCs;
   a second switching matrix of a second plurality of switches connected at a first end to the second plurality of RDCs and at a second end to the plurality of OIMs for routing the plurality of communications services to the plurality of OIMs, each of the plurality of OIMs separately addressable by each RDC of the second plurality of RDCs; and
   a control module configured for routing the plurality of communications services to the first plurality of RDCs and for routing the plurality of communications services to the plurality of OIMs, wherein
   the control module is configured, in the event of a failure of a first communications service, for controlling routing of a second communications service through the plurality of RDCs and the first and second switching matrices to at least one of the plurality of OIMs to provide a substitute service for the failed first communications service.

2. The system of claim 1, further comprising a plurality of detectors configured to detect that the first communications service of the plurality of communications services has failed.

3. The system of claim 1, wherein the control module further comprises hardware and software for controlling the routing of the plurality of communications services, and the controlled routing disables a first communication path for the first failed communications service and connects a second communication path for the second communications service of the plurality of communications services to provide the substitute service.

4. The system of claim 3, wherein at least one of the first switching matrix and the second switching matrix is further configured for controlling routing of the second communications service of the plurality of communications services through the plurality of RDCs to the plurality of OIMs to provide a substitute service for a second failed service.

5. The system of claim 1, wherein the plurality of RDC modules comprises a first plurality of RDC modules connected to a second plurality of RDC modules, the system further comprising:
   a head end unit (HEU) including the first plurality of RDC modules and the first switching matrix, the HEU configured for connecting the plurality of communications services to the first plurality of RDC modules through the first switching matrix; and
   an optical input unit (OIU) including the second plurality of RDC modules and a second switching matrix, the OIU configured for connecting the second plurality of RDC modules to the plurality of OIMs through the second switching matrix.

6. The system of claim 1, wherein the plurality of OIMs are connected to a plurality of clients, wherein the plurality of clients are wireless devices selected from the group consisting of cellular phones, smart phones, wireless lap-top computers, tablet computers, pad computers, and sensor networks.

7. The system of claim 1, wherein the plurality of communications services comprises at least two services selected from the group consisting of WiFi, Ethernet, DSL, LTE, Wireless Access Points (WAPs), PCS, 2G, 3G, 4G, Remote Radio Heads (RRH), Radio over Fiber Optic Cable (RoF), WiMax, LAN, CDMA, TDMA, GSM, WDM, and WLAN.

8. The system of claim 7, wherein the system is configured to serve a geographic area selected from the group consisting of a building, an area of a building, and one or more rooms of a building.

9. The system of claim 2, further comprising a network configured for providing the plurality of communications services, wherein the control module is in communication with the network, and wherein the detection by the plurality of detectors that the first communications service of the plurality of communications services has failed further comprises the steps of:
 detecting at the network whether the first communications service of the plurality of communications services has failed; and
 communicating the detected failure at the network to the control module.

10. The system of claim 2, wherein:
 each of the plurality of RDCs, each of the plurality of OIMs, and each of the plurality of communications services are in communication with at least one of the plurality of detectors; and
 the detection by the plurality of detectors that the first communications service has failed comprises the step of detecting with at at least one detector whether a current, voltage, or power level of the first communications service has dropped below a predetermined level, the predetermined level being indicative of a failure of the first communications service.

11. The system of claim 1, wherein the control module is configured for determining that at least one communications service of the plurality of communications services is operational by:
 determining available bandwidth of the at least one communications service; and
 controlling switching to provide a path of the at least one operational service to a first OIM of the plurality of OIMs based upon the available bandwidth.

12. The system of claim 11, wherein the step of providing the path based upon the available bandwidth further comprises the steps of:
 obtaining configuration data associated with a client;
 determining one or more communications services connected to the first OIM that the client is authorized to access; and
 controlling switching to provide a path of the least one operational service to the first OIM of the plurality of OIMs based upon the access authorization of the client.

13. A distributed antenna system (DAS), comprising:
 a first plurality of radio distribution/combiners (RDCs) configured for connecting to a plurality of communications services, each of the plurality of communications services provided through at least one sector;
 a second plurality of RDCs connected with the first plurality of RDCs, the second plurality of RDCs configured for connecting to a plurality of Optical Input Modules (OIMs) for receiving the plurality of communications services, each of the second plurality of RDCs connected with one of the first plurality of RDCs;
 a first switching matrix of a first plurality of switches connected at a first end to the plurality of communications services and at a second end to the first plurality of RDCs for routing the plurality of communications services to the first plurality of RDCs, each of the second plurality of RDCs separately addressable by one RDC of the first plurality of RDCs;
 a second switching matrix of a second plurality of switches connected at a first end to the second plurality of RDCs and at a second end to the plurality of OIMs for routing the plurality of communications services to the plurality of OIMs, each of the plurality of OIMs separately addressable by each RDC of the second plurality of RDCs; and
 a control module configured for routing the plurality of communications services to the first plurality of RDCs and for routing the plurality of communications services to the plurality of OIMs;
 wherein the control module is configured, in the event of a failure of a first communications service, for controlling routing of a second communications service through the plurality of RDCs and the first and second switching matrices to at least one of the plurality of optical input modules (OIMs) to provide a substitute service for the failed first communications service.

14. The distributed antenna system of claim 13, further comprising a head end unit (HEU), the HEU including the first plurality of RDCs and the first switching matrix and an optical input unit (OIU), the OIU including the second plurality of RDCs and the second switching matrix, the first plurality of RDCs further configured for combining the plurality of communications services into a broadband communication signal or for expanding the broadband communication signal into a plurality of communications services.

15. The distributed antenna system of claim 13, wherein each of the plurality of communications services has a number of redundant paths through the first switching matrix equal to a quantity of communications sectors times a quantity of the first plurality of RDCs.

16. The distributed antenna system of claim 15, wherein each of the plurality of OIMs has a quantity of redundant paths through the second switching matrix equal to a quantity of communications sectors times the second plurality of RDCs.

17. A method for controlling a distributed antenna system (DAS), the method comprising:
 arranging a plurality of radio distributor/combiner (RDC) modules for connecting a plurality of communications services with a plurality of optical input modules (OIMs), each of the plurality of communications services provided through one or more sectors;
 providing a plurality of primary communication paths for the plurality of communications services through the plurality of RDC modules to the plurality of OIMs;
 detecting a failure of at least one first communications service of the plurality of communications services; and
 controlling routing of at least one second communications service of the plurality of communications services from the plurality of primary communication paths to at least one secondary redundant communication path to provide a substitute service for the at least one failed first communications service.

18. The method of claim 17, wherein:
the plurality of RDC modules comprises a first plurality of radio distributor/combiner (RDC) modules and a second plurality of RDC modules;
the first plurality of RDC modules are configured for connecting the plurality of communications services with the second plurality of RDC modules and for combining the plurality of communications services into a broadband communication signal or for expanding the broadband communication signal into a plurality of communications services; and
the second plurality of RDC modules are configured for connecting the broadband communication signal with the plurality of OIMs.

19. The method of claim 17, further comprising:
restoring the at least one failed first communications service;
controlling switching of the at least one second communications service from the at least one secondary redundant communication path back to the plurality of primary communication paths; and
controlling switching of the at least one failed first communications service on the plurality of primary communication paths.

20. The method of claim 17, further comprising disconnecting the at least one failed first communications service, wherein the step of controlling routing of the at least one second communications service of the plurality of communications services from the plurality of primary communication paths to the at least one secondary redundant communication path further comprises the steps of:
determining an operational substitute communications service for use as the at least one second communications service from among the plurality of communications services;
configuring the at least one secondary redundant communication path using the operational substitute communications service in place of the at least one failed first communications service; and
connecting the operational substitute communications service to the at least one secondary redundant communication path.

21. The method of claim 17, wherein the plurality of communications services through the plurality of RDC modules to the plurality of OIMs further includes a third communications service to a first OIM of the plurality of OIMs, and further comprising:
detecting an occurrence that the third communications service has failed; and
controlling routing of the at least one second communications services from the plurality of primary communication paths to a plurality of secondary communication paths to provide a substitute service for the failed third communications service.

22. The method of claim 19, further comprising:
determining available bandwidth of the plurality of communications services remaining operational after the first communications service has failed; and
selecting the at least one second communications service for routing to a plurality of secondary communication paths based upon the available bandwidth.

23. The method of claim 22, wherein the step of determining the available bandwidth further comprises the steps of:
obtaining configuration data associated with a remote antenna unit and a client of the at least one failed first communications service;
determining one or more communications services connected to the second plurality of RDC modules that the client is authorized to access; and
selecting at least a second of the plurality of communications services for routing to the plurality of secondary communication paths based upon the available bandwidth and based upon the access authorization of the client of the at least one failed first communications service.

24. The method of claim 23, wherein the step of detecting the occurrence of the failure of the at least one first communications services further comprises detecting whether the at least one first communications service has failed at a network input.

25. The method of claim 24, wherein the step of detecting the occurrence of the failure of at the least one first communications service is accomplished by a customer complaint.

* * * * *